US012732857B2

(12) United States Patent
Canpolat et al.

(10) Patent No.: US 12,732,857 B2
(45) Date of Patent: Sep. 8, 2026

(54) APPARATUS, SYSTEM, AND METHOD OF COMMUNICATING FLOW-GROUP QUALITY OF SERVICE (QoS) INFORMATION

(71) Applicant: Intel Corporation, Santa Clara, CA (US)

(72) Inventors: Necati Canpolat, Beaverton, OR (US); Alexandre Saso Stojanovski, Paris (FR); Javier Perez-Ramirez, North Plains, OR (US); Laurent Cariou, Milizac (FR); Dibakar Das, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/186,186

(22) Filed: Mar. 19, 2023

(65) Prior Publication Data

US 2023/0232275 A1 Jul. 20, 2023

(51) Int. Cl.
*H04W 28/02* (2009.01)

(52) U.S. Cl.
CPC ................................ *H04W 28/0268* (2013.01)

(58) Field of Classification Search
CPC ......... H04W 28/0268; H04W 28/0263; H04W 28/24; H04L 47/2441
USPC .................................................. 370/328–330
See application file for complete search history.

(56) References Cited

U.S. PATENT DOCUMENTS

2013/0128809 A1* 5/2013 Wentink .................. H04L 45/74 370/328
2018/0048427 A1* 2/2018 Lou ........................... H04L 1/18
2019/0268099 A1* 8/2019 Chu ..................... H04B 7/2612
2020/0245184 A1* 7/2020 Jin .......................... H04L 45/74
2020/0351984 A1* 11/2020 Talebi Fard ............ H04W 4/08

(Continued)

FOREIGN PATENT DOCUMENTS

CN 116828547 9/2023
WO 2022/233439 A1 11/2022

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Candal Elpenord
(74) *Attorney, Agent, or Firm* — Shichrur & Co.

(57) ABSTRACT

For example, a wireless communication station (STA) may be configured to set flow-group Quality of Service (QoS) information corresponding to a Medium Access Control (MAC) Service Data Unit (MSDU) in a traffic flow belonging to a flow group including a plurality of traffic flows. For example, the flow-group QoS information corresponding to the MSDU may include a flow identifier (ID) to identify the traffic flow, a flow group ID to identify the flow group, and MSDU set information corresponding to an MSDU set including the MSDU. For example, the STA may be configured to transmit a Physical Layer (PHY) Protocol Data Unit (PPDU) including the MSDU, wherein the PPDU includes the flow-group QoS information corresponding to the MSDU.

20 Claims, 10 Drawing Sheets

802

Set at a wireless communication station (STA) flow-group Quality of Service (QoS) information corresponding to a Medium Access Control (MAC) Service Data Unit (MSDU) in a traffic flow belonging to a flow group including a plurality of traffic flows, wherein the flow-group QoS information corresponding to the MSDU includes a flow identifier (ID) to identify the traffic flow, a flow group ID to identify the flow group, and MSDU set information corresponding to an MSDU set including the MSDU

804

Transmit a Physical Layer (PHY) Protocol Data Unit (PPDU) including the MSDU, wherein the PPDU includes the flow-group QoS information corresponding to the MSDU

(56) References Cited

U.S. PATENT DOCUMENTS

| | | | | |
|---|---|---|---|---|
| 2020/0413285 | A1 | 12/2020 | Li et al. | |
| 2021/0076251 | A1* | 3/2021 | Ho | H04L 65/80 |
| 2025/0279967 | A1* | 9/2025 | Xu | H04W 28/10 |

OTHER PUBLICATIONS

3GPP TR 23.700-60 V18.0.0 (Dec. 2022), 3rd Generation Partnership Project; Technical Specification Group Services and System Aspects; Study on XR (Extended Reality) and media services (Release 18), 266 pages.

Search Report for European Patent Application No. 23208580.3, mailed on Apr. 26, 2024, 11 pages.

Samsung: "Solution on multi-modality support for single UE (Key issue #1)", 3GPP Draft; S2-2202746, vol. SA WG2, No. e-meeting; Mar. 29, 2022 (Mar. 29, 2022), XP052159124, 3 pages.

* cited by examiner

APPARATUS, SYSTEM, AND METHOD OF COMMUNICATING FLOW-GROUP QUALITY OF SERVICE (QoS) INFORMATION

TECHNICAL FIELD

Aspects described herein generally relate to communicating flow-group Quality of Service (QoS) information.

BACKGROUND

Devices in a wireless communication system may be configured to communicate according to communication protocols, which may utilize one or more wireless communication channels for communication of different types of data over one or more streams.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
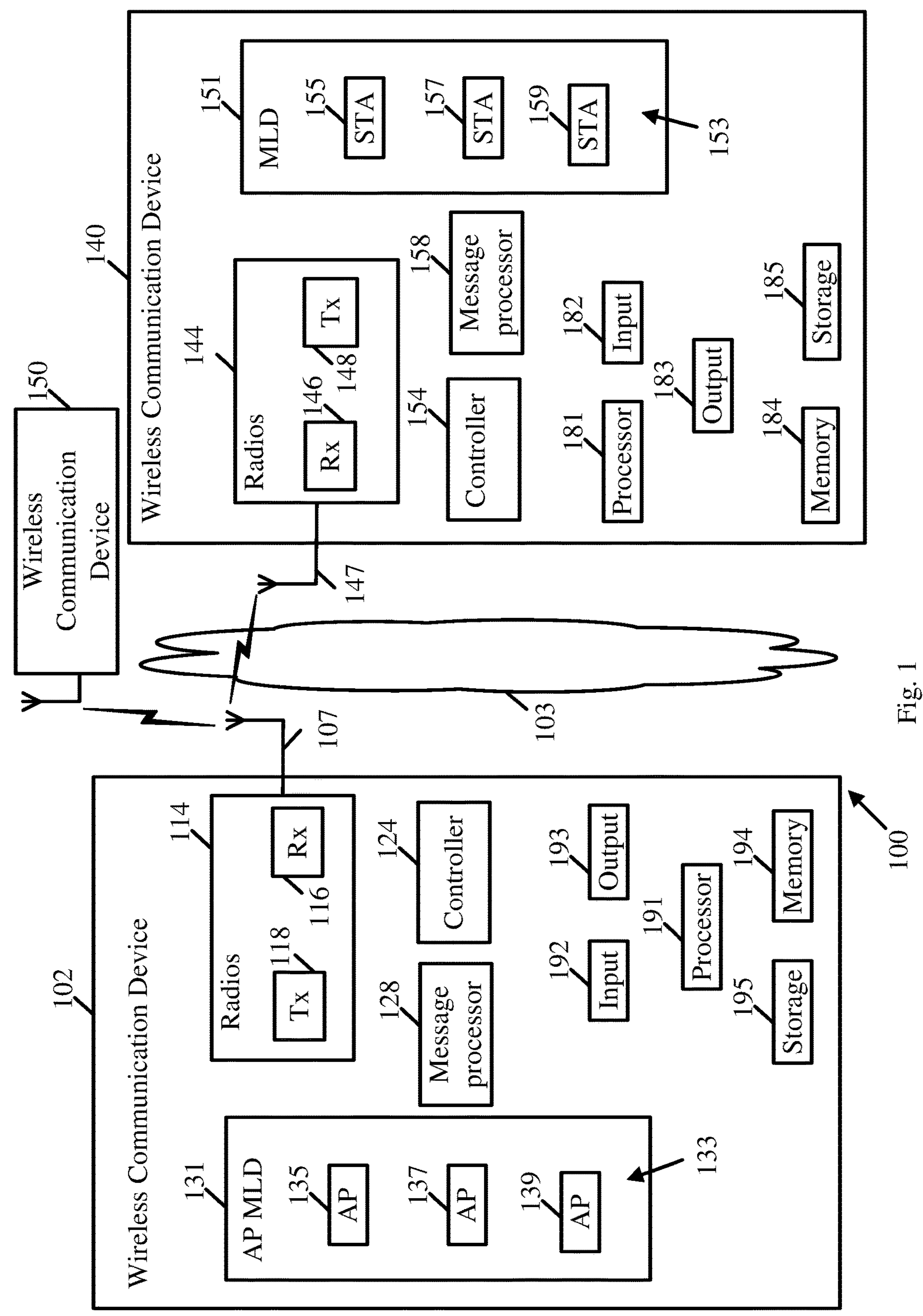
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE* 802.11-2020*, IEEE Standard for Information Technology—Telecommunications and Information Exchange between Systems Local and Metropolitan Area Networks—Specific Requirements; Part* 11*: Wireless LAN Medium Access Control* (*MAC*) *and Physical Layer* (*PHY*) *Specifications, December,* 2020); and/or IEEE 802.11be (*IEEE P*802.11*be/* D2.0 *Draft Standard for Information technology—Telecommunications and information exchange between systems Local and metropolitan area networks—Specific requirements; Part* 11*: Wireless LAN Medium Access Control* (*MAC*) *and Physical Layer* (*PHY*) *Specifications; Amendment* 8: *Enhancements for extremely high throughput* (*EHT*), May 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared, dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mmWave STA (mSTA), which may include for example, a STA having a radio transmitter, which is capable of operating on a channel that is within the mmWave frequency band. In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHz.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHz channels. For example, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 150, and/or one or more other devices.

In some demonstrative aspects, devices 102, 140 and/or 150 may include a mobile device or a non-mobile, e.g., a static, device.

For example, devices 102, 140 and/or 150 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 150 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in an mmWave wireless communication frequency band.

In other aspects, WM 103 may include any other type of channel over any other frequency band.

In some demonstrative aspects, device 102, device 140, and/or device 150 may include one or more radios including circuitry and/or logic to perform wireless communication between devices 102, 140, 150 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more antennas.

In some demonstrative aspects, device 102 may include one or more antennas 107, and/or device 140 may include one or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 150 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 150 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102, device 140, and/or device 150 may include, operate as, perform the role of, and/or perform one or more functionalities of, one or more STAs. For example, device 102 may include at least one STA, device 140 may include at least one STA, and/or device 150 may include at least one STA.

In some demonstrative aspects, device 102, device 140, and/or device 150 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In some demonstrative aspects, for example, devices 102, 140 and/or 150 may be configured to perform one or more operations, and/or functionalities of a WiFi 8 STA.

In other aspects, for example, devices 102, 140 and/or 150 may be configured to perform one or more operations, and/or functionalities of an Ultra High Reliability (UHR) STA.

In other aspects, for example, devices 102, 140 and/or 150 may be configured to perform one or more operations, and/or functionalities of any other additional or alternative type of STA.

In other aspects, device 102, device 140, and/or device 150 may include, operate as, perform the role of, and/or perform one or more functionalities of, any other wireless device and/or station, e.g., a WLAN STA, a WiFi STA, and the like.

In some demonstrative aspects, device 102, device 140, and/or device 150 may be configured operate as, perform the role of, and/or perform one or more functionalities of, an access point (AP), e.g., an EHT AP STA.

In some demonstrative aspects, device 102, device 140, and/or device 150 may be configured to operate as, perform the role of, and/or perform one or more functionalities of, a non-AP STA, e.g., an EHT non-AP STA.

In other aspects, device 102, device 140, and/or device 150 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102, 140, and/or 150 may be configured to communicate in an EHT network, and/or any other network.

In some demonstrative aspects, devices 102, 140, and/or 150 may be configured to operate in accordance with one or more Specifications, for example, including one or more *IEEE* 802.11 *Specifications*, e.g., an *IEEE* 802.11-2020 *Specification*, an *IEEE* 802.11*be Specification*, and/or any other specification and/or protocol.

In some demonstrative aspects, device 102, device 140, and/or device 150 may include, operate as, perform a role of, and/or perform the functionality of, one or more multi-link logical entities, e.g., as described below.

In other aspect, device 102, device 140, and/or device 150 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102, device 140, and/or device 150 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102, device 140, and/or device 150 may be configured to operate as, perform the role of, and/or perform one or more functionalities of, an AP MLD.

In some demonstrative aspects, device 102, device 140, and/or device 150 may be configured to operate as, perform the role of, and/or perform one or more functionalities of, a non-AP MLD.

In other aspects, device 102, device 140, and/or device 150 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 GHz band, as described below.

In some demonstrative aspects, for example, the one or more radios 114 may include, for example, a radio for communication by AP STA 137 over a second wireless communication frequency channel and/or frequency band, e.g., a 5 GHz band, as described below.

In some demonstrative aspects, for example, the one or more radios 114 may include, for example, a radio for communication by AP STA 139 over a third wireless communication frequency channel and/or frequency band, e.g., a 6 GHz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects, controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 GHz band, as described below.

In some demonstrative aspects, for example, the one or more radios 144 may include, for example, a radio for communication by STA 157 over a second wireless communication frequency channel and/or frequency band, e.g., a 5 GHz band, as described below.

In some demonstrative aspects, for example, the one or more radios 144 may include, for example, a radio for communication by STA 159 over a third wireless communication frequency channel and/or frequency band, e.g., a 6 GHz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
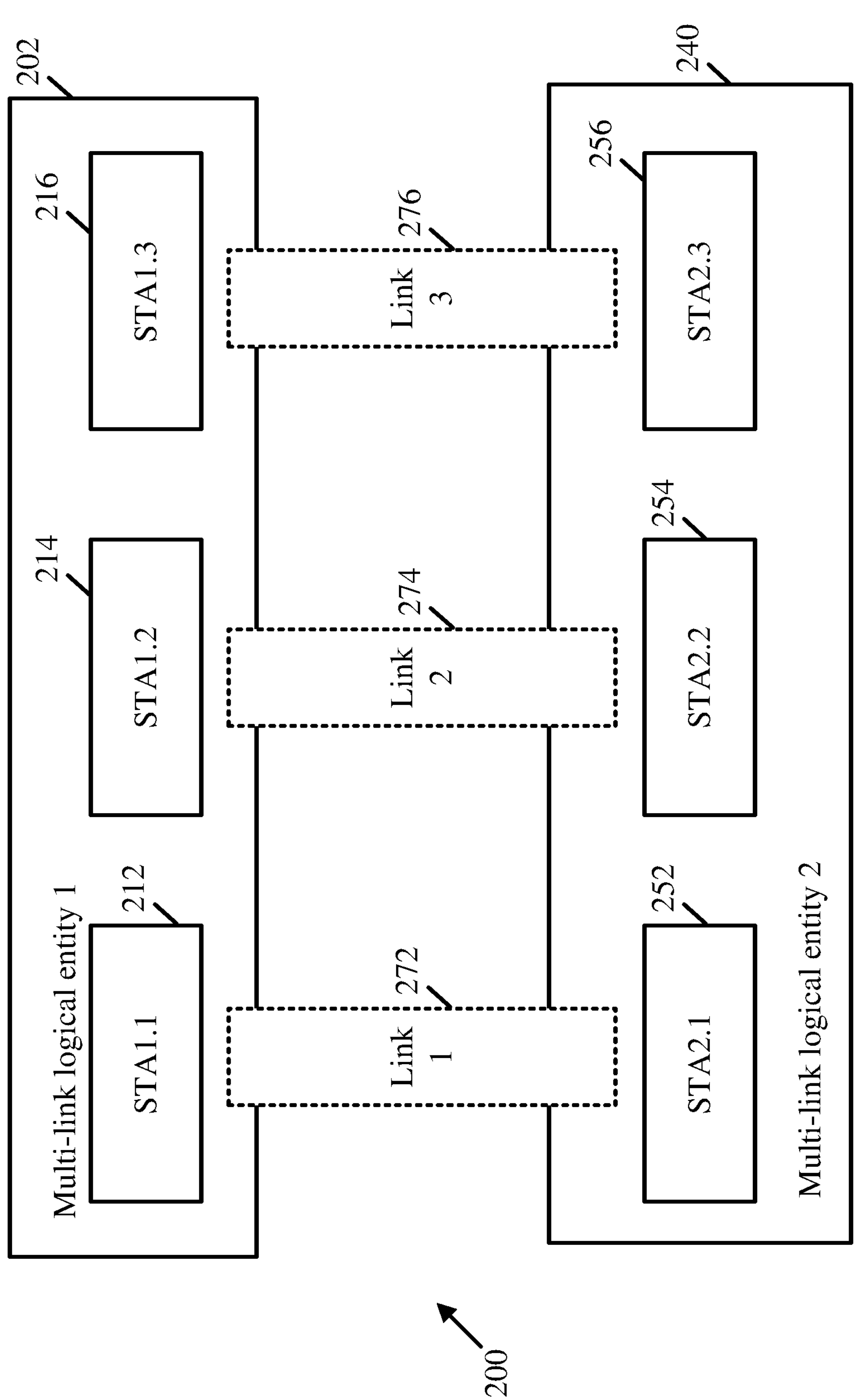
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
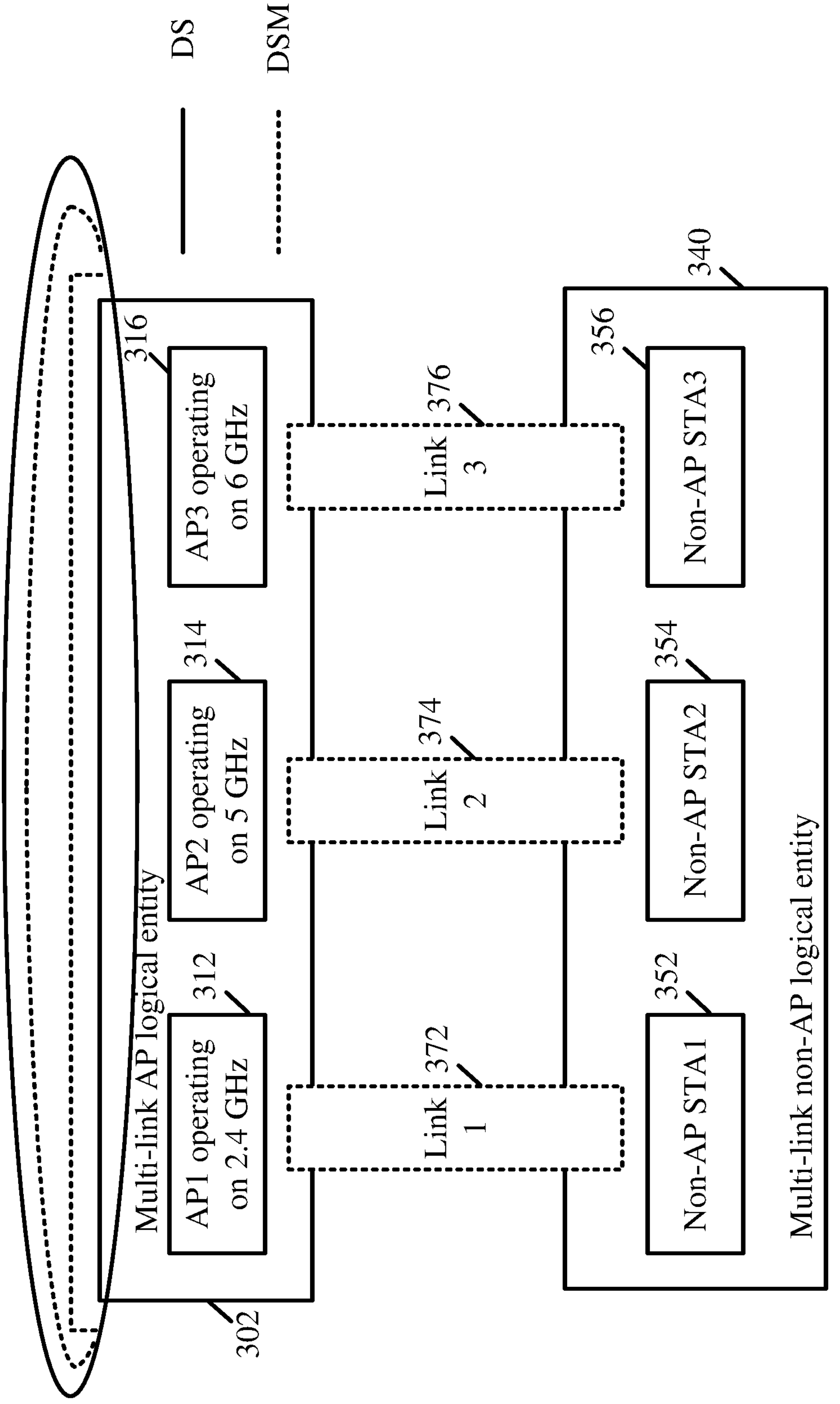
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 GHz frequency band, AP STA 314 may be configured to communicate over a 5 GHz frequency band, and/or AP STA 316 may be configured to communicate over a 6 GHz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102, 140 and/or 150 may be configured to perform wireless communication according to a flow-group scheduling mechanism, which may be configured to provide a technical solution to support scheduling of a plurality of flows of a flow group, e.g., as described below.

In some demonstrative aspects, the flow group may include a plurality of correlated traffic flows, for example, according to a correlation requirement, e.g., as described below.

In some demonstrative aspects, the flow group may include a plurality of traffic flows to be synchronized, for example, according to a synchronization requirement, e.g., as described below.

In some demonstrative aspects, the flow group may include a multi-modality traffic flow, e.g., as described below.

In some demonstrative aspects, the flow group may include an Extended Reality (XR) traffic flow, e.g., as described below.

For example, a session, e.g., an XR session, may include multiple streams, which may carry different types of data, e.g., as described below.

In other aspects, the flow group may include any other additional or alternative types of traffic flows, which may be group according to any other additional or alternative criteria.

In some demonstrative aspects, the flow-group scheduling mechanism may be configured to provide a technical solution to support scheduling of the plurality of flows of the flow group, for example, according to one or more Quality of Service (QoS) requirements, e.g., as described below.

In some demonstrative aspects, the flow-group scheduling mechanism may be configured to provide a technical solution to support scheduling of the plurality of flows of the flow group, for example, according to one or more QoS correlation requirements, e.g., as described below.

In some demonstrative aspects, the flow-group scheduling mechanism may be configured to provide a technical solution to support scheduling of the plurality of flows of the flow group, for example, according to one or more QoS synchronization requirements, e.g., as described below.

For example, an application, e.g., a Virtual Reality (VR) application, may require a user to periodically send various types of information, for example, including haptic information from gloves, positioning and view information, as well as audio information.

For example, a server, e.g., an application server, may send different streams of data, e.g., rendered video streams, audio, and/or haptic data, to the user.

For example, there may be a need to provide a technical solution to support packets belonging to two different flows to arrive at the user's end closely in time, for example, in order to support a fully immersive user experience, where the user will not be able to detect any substantial synchronization issues between different streams of data.

For example, in some cases, there may be a close correlation between some frames compared to others, e.g., even for packets belonging to a same stream, for example, for a video stream. For example, in case of video, decoding of a particular frame may depend on correctly decoding other frames. Accordingly, if a particular frame is dropped by a network, it may not be useful to deliver other frames, which are dependent on the dropped frame.

In some demonstrative aspects, devices 102, 140 and/or 150 may be configured to perform wireless communication according to a flow-group scheduling mechanism, which may be configured to provide a technical solution to support communication of a flow group over a WLAN, for example, a WiFi network and/or any other WLAN, e.g., as described below.

For example, in some WLAN topologies, e.g., Wi-Fi topologies, an application server may be an edge device, e.g., a laptop, which may be connected to an end user via an AP, e.g., a common AP to which both STAs are associated. For example, the WLAN AP may forward layer-2 traffic, for example, without knowing the detailed QoS flow information of the group flow.

In some demonstrative aspects, the flow-group scheduling mechanism may be configured to provide a technical solution to support the AP of the WLAN in scheduling packets of the group flow, for example, in a way which may meet synchronization requirements among the different correlated flows of the group flow, e.g., as described below.

In some demonstrative aspects, the flow-group scheduling mechanism may be configured to provide a technical solution to provide the AP of the WLAN with QoS information, e.g., detailed QoS information, corresponding to the flow group, e.g., as described below.

In some demonstrative aspects, the flow-group scheduling mechanism may be configured to provide a technical solution to provide the AP of the WLAN with QoS information, which may be configured to support the AP of the WLAN in identifying correlated flows and/or efficiently forwarding MAC Service Data Units (MSDUs) corresponding to the flow group, for example, in order to meet an end-user experience requirement, e.g., as described below.

In some demonstrative aspects, the QoS information of the flow group may include MSDU set information corresponding to an MSDU set in a flow, e.g., as described below.

In some demonstrative aspects, an MSDU set (also referred to as a "QoS frame set", or an "XR frame set") may include a set of MSDUs, e.g., that are dependent on each other, and belong to a specific QoS flow, which may be associated with a QoS session, e.g., an XR session.

In some demonstrative aspects, controller 154 may be configured to control, trigger, cause, and/or instruct a STA implemented by device 140 to set flow-group QoS information in a traffic flow belonging to a flow group, e.g., as described below.

In some demonstrative aspects, the traffic flow may belong to a flow group including a plurality of traffic flows, e.g., as described below.

In some demonstrative aspects, the flow-group QoS information corresponding to the MSDU may include a flow identifier (ID) to identify the traffic flow, e.g., as described below.

In some demonstrative aspects, the flow-group QoS information corresponding to the MSDU may include a flow group ID to identify the flow group, e.g., as described below.

In some demonstrative aspects, the flow-group QoS information corresponding to the MSDU may include MSDU set information corresponding to an MSDU set including the MSDU, e.g., as described below.

In some demonstrative aspects, the flow group may include a plurality of QoS-correlated traffic flows, for example, according to a QoS correlation requirement, e.g., as described below.

In some demonstrative aspects, the flow group may include a plurality of traffic flows to be synchronized according to a QoS synchronization requirement, e.g., as described below.

In some demonstrative aspects, the flow group may include a multi-modality traffic flow including a plurality of dependent data streams, e.g., as described below.

In other aspects, the flow group may include any other additional type of group of traffic flows, which may be grouped according to any other additional or alternative criteria.

In some demonstrative aspects, the traffic flow may include an XR traffic flow, e.g., as described below.

In other aspects, the traffic flow may include any other additional or alternative type of traffic flow.

In some demonstrative aspects, controller 154 may be configured to control, trigger, cause, and/or instruct the STA implemented by device 140 to transmit a PPDU including the MSDU, e.g., as described below.

In some demonstrative aspects, the PPDU may include the flow-group QoS information corresponding to the MSDU, e.g., as described below.

In some demonstrative aspects, the STA implemented by device 140 may include a non-AP STA. For example, controller 154 may be configured to control, trigger, cause, and/or instruct the non-AP STA implemented by device 140 to transmit the PPDU to an AP, e.g., as described below.

In some demonstrative aspects, controller 124 may be configured to control, trigger, cause, and/or instruct a STA implemented by device 102 to process a received PPDU from another STA, e.g., as described below.

In some demonstrative aspects, the received PPDU may include the PPDU transmitted by the STA implemented by device 140.

In some demonstrative aspects, the STA implemented by device 102 may include an AP. For example, controller 124 may be configured to control, trigger, cause, and/or instruct the AP STA implemented by device 102 to process the PPDU from the non-AP STA implemented by device 102, e.g., as described below.

In some demonstrative aspects, controller 124 may be configured to control, trigger, cause, and/or instruct the STA implemented by device 102 to process the received PPDU, for example, to identify flow-group QoS information corresponding to an MSDU in the PPDU, e.g., as described below.

In some demonstrative aspects, the flow-group QoS information corresponding to the MSDU may include a flow ID to identify a traffic flow including the MSDU, e.g., as described below.

In some demonstrative aspects, the flow-group QoS information corresponding to the MSDU may include a flow group ID to identify a flow group including a plurality of traffic flows, e.g., as described below.

In some demonstrative aspects, the flow-group QoS information corresponding to the MSDU may include MSDU set information corresponding to an MSDU set including the MSDU, e.g., as described below.

In some demonstrative aspects, controller 124 may be configured to control, trigger, cause, and/or instruct the STA implemented by device 102 to schedule transmission of the MSDU, for example, based on the flow-group QoS information corresponding to the MSDU, e.g., as described below.

For example, an AP implemented by device 102 may schedule transmission of the MSDU received from a STA implemented by device 140 to a STA implemented by device 150, for example, based on the flow-group QoS information corresponding to the MSDU.

In some demonstrative aspects, controller 124 may be configured to control, trigger, cause, and/or instruct the STA implemented by device 102 to select whether to schedule the MSDU in a group transmission together with one or more other MSDUs, for example, based on the flow-group QoS information corresponding to the MSDU, e.g., as described below.

In some demonstrative aspects, controller 124 may be configured to control, trigger, cause, and/or instruct the STA implemented by device 102 to select whether to schedule the MSDU in a group transmission together with one or more other MSDUs, for example, based on the flow group ID corresponding to the MSDU, and/or the MSDU set ID corresponding to the MSDU, e.g., as described below.

In some demonstrative aspects, controller 124 may be configured to control, trigger, cause, and/or instruct the STA implemented by device 102 to select to schedule the MSDU in a group transmission together with one or more other MSDUs for example, having a same flow group ID as the MSDU, and/or a same MSDU set ID as the MSDU, e.g., as described below.

In some demonstrative aspects, controller 124 may be configured to control, trigger, cause, and/or instruct the STA implemented by device 102 to select to drop one or more other MSDUs based on the flow-group QoS information corresponding to the MSDU, e.g., as described below.

In some demonstrative aspects, controller 124 may be configured to control, trigger, cause, and/or instruct the STA implemented by device 102 to select to drop one or more other MSDUs having a lower priority than a priority of the MSDU indicated by the flow-group QoS information corresponding to the MSDU, e.g., as described below.

In some demonstrative aspects, controller 124 may be configured to control, trigger, cause, and/or instruct the STA implemented by device 102 to schedule transmission of the MSDU to be transmitted, for example, based on reception of one or more other MSDUs of the MSDU set, e.g., as described below.

In some demonstrative aspects, controller 124 may be configured to control, trigger, cause, and/or instruct the STA implemented by device 102 to schedule transmission of the MSDU to be transmitted, for example, only after one or more other MSDUs of the MSDU set have been received by the STA implemented by device 102, e.g., as described below.

In some demonstrative aspects, controller 124 may be configured to control, trigger, cause, and/or instruct the STA implemented by device 102 to schedule transmission of the MSDU to be transmitted, for example, only after all other MSDUs of the MSDU set have been received by the STA implemented by device 102, e.g., as described below.

In some demonstrative aspects, controller 154 may be configured to control, trigger, cause, and/or instruct the STA implemented by device 140 to set the flow-group QoS information corresponding to the MSDU in a MAC header of the PPDU including the MSDU, e.g., as described below.

In some demonstrative aspects, controller 154 may be configured to control, trigger, cause, and/or instruct the STA implemented by device 140 to set the flow-group QoS information in an Aggregated Control (A-control) field in the MAC header of the PPDU, e.g., as described below.

In some demonstrative aspects, the A-control field may include a control ID subfield, and a control information subfield, e.g., as described below.

In some demonstrative aspects, the control ID field may be configured to indicate an A-control field type for flow group QoS, e.g., as described below.

In some demonstrative aspects, the control information subfield may include the flow-group QoS information, e.g., as described below.

In some demonstrative aspects, the control ID subfield may include 4 bits, and the control information subfield may include up to 26 bits. In other aspects, the control ID subfield and the control information subfield may include any other number of bits.

In some demonstrative aspects, controller 154 may be configured to control, trigger, cause, and/or instruct the STA implemented by device 140 to set the flow-group QoS information corresponding to the MSDU as metadata in a payload of the MSDU, e.g., as described below.

In some demonstrative aspects, controller 154 may be configured to control, trigger, cause, and/or instruct the STA implemented by device 140 to set the flow-group QoS information corresponding to the MSDU in a control or management frame aggregated with the MSDU in the PPDU, e.g., as described below.

In other aspects, controller 154 may be configured to control, trigger, cause, and/or instruct the STA implemented by device 140 to set the flow-group QoS information corresponding to the MSDU in any other part of the MSDU and/or in any other part of the PPDU including the MSDU.

In some demonstrative aspects, controller 154 may be configured to control, trigger, cause, and/or instruct the STA implemented by device 140 to set the flow-group QoS information corresponding to an MSD in an XR traffic flow, e.g., as described below.

In some demonstrative aspects, controller 154 may be configured to control, trigger, cause, and/or instruct the STA implemented by device 140 to set the flow group ID in the flow-group QoS information corresponding to an MSD to include an XR multi-modal flow ID to identify an XR multi-modality traffic flow, e.g., as described below.

In other aspects, flow group ID in the flow-group QoS information corresponding to an MSD in a traffic flow belonging to a flow group may include any other additional or alternative information to identify the flow group.

In some demonstrative aspects, the flow ID in the flow-group QoS information corresponding to an MSD in a traffic flow may include a Stream Classification Service (SCS) ID (SCSID) to identify the traffic flow, e.g., as described below.

In some demonstrative aspects, the flow ID in the flow-group QoS information corresponding to an MSD in a traffic flow may include a tuple configured to identify the traffic flow, e.g., as described below.

In some demonstrative aspects, the tuple may include an SCSID to identify a plurality of QoS flows, and a Traffic Identifier (TID) to identify the traffic flow within the plurality of QoS flows, e.g., as described below.

In other aspects, the flow ID in the flow-group QoS information corresponding to an MSD in a traffic flow may include any other additional or alternative information to identify the traffic flow.

In some demonstrative aspects, controller 154 may be configured to control, trigger, cause, and/or instruct the STA implemented by device 140 to set the flow-group QoS information to include the MSDU set information corresponding to the MSDU set including the MSDU, e.g., as described below.

In some demonstrative aspects, the MSDU set information may include an MSDU set ID to identify the MSDU set, e.g., as described below.

In some demonstrative aspects, the MSDU set information may include a Serial Number (SN) to indicate an SN of the MSDU within the MSDU set, e.g., as described below.

In some demonstrative aspects, the SN of the MSDU within the MSDU set may be based on a MAC Protocol Data Unit (MPDU) SN of an MPDU including the MSDU, e.g., as described below.

In other aspects, the SN of the MSDU within the MSDU set may be based on any other additional or alternative parameter.

In some demonstrative aspects, the MSDU set information may include MSDU priority information to indicate a priority of the MSDU within the MSDU set, e.g., as described below.

In some demonstrative aspects, the MSDU set information may include MSDU set priority information to indicate a priority of the MSDU set, e.g., as described below.

In some demonstrative aspects, the MSDU set information may include MSDU count information to indicate a number of MSDUs within the MSDU set, e.g., as described below.

In other aspects, e MSDU set information may include any other additional or alternative information corresponding to the MSDU set.

In some demonstrative aspects, controller 154 may be configured to allow the STA implemented by device 140 to generate the PPDU including an Aggregate MSDU (A-MSDU), which includes an aggregation of a plurality of MSDUs having a same QoS importance, e.g., as described below.

In some demonstrative aspects, device 102, device 140, and/or device 150 may be configured to communicate QoS data frames according to a flow-group scheduling mechanism, e.g., as described below.

In some demonstrative aspects, a STA ("transmitter STA") to transmit a QoS data frame, e.g., device 140, may be configured to signal for the QoS data frame, e.g., for each QoS data frame, one or more types of QoS information, e.g., as described below.

In some demonstrative aspects, the QoS information for the QoS data frame, e.g., an XR frame, may include, for example, a flow identifier of a flow including the QoS data frame, e.g., as described below.

In some demonstrative aspects, the QoS information for the QoS data frame may include, for example, an identifier ("XR Multi-modal Flow ID") that has a same value for all correlated flows in a flow group, e.g., as described below.

In some demonstrative aspects, the QoS information for the QoS data frame may include, for example, an index of a QoS frame set, e.g., an XR frame set, to which the QoS data frame belongs, e.g., as described below.

In some demonstrative aspects, the QoS information for the QoS data frame may include, for example, an index of the QoS data frame within the QoS frame set (XR frame set), e.g., as described below.

In some demonstrative aspects, the QoS information for the QoS data frame may include, for example, an indication of a priority of the QoS data frame within the QoS data frame set, e.g., the XR frame set, e.g., as described below.

In some demonstrative aspects, the QoS information for the QoS data frame may include, for example, an indication of a priority of the QoS data frame set (XR data frame set) itself, e.g., as described below.

In some demonstrative aspects, the QoS information for the QoS data frame may include, for example, an indication of a number of frames within the QoS data frame set (XR frame set), e.g., as described below.

In some demonstrative aspects, the flow identifier may include an SCSID, which may be negotiated, for example, via an SCS Request/Response mechanism, e.g., in accordance with an IEEE 802.11 Specification.

In some demonstrative aspects, the index of the QoS data frame within the QoS data frame set, e.g., the XR frame set, may be determined through, and/or based on, an SN of the MPDU. For example, it may be assumed that all MSDUs belonging to the QoS flow are mapped to a same TID. For example, it may be assumed that even if the MPDU contains multiple MSDUs, the MSDUs share similar characteristics, and hence may be grouped together under the same SN.

In some demonstrative aspects, the flow identifier, the index of the QoS data frame, and/or any other QoS information for the QoS data frame may be carried in an Aggregated Control (A-Ctrl) field, and/or within any other field in the MAC header of the PPDU carrying the QoS data frame.

In some demonstrative aspects, the flow identifier, the index of the QoS data frame, and/or any other QoS information for the QoS data frame may be carried as metadata inside a payload of the MSDU.

In some demonstrative aspects, the flow identifier, the index of the QoS data frame, and/or any other QoS information for the QoS data frame may be carried in a separate frame, e.g., a Control (Ctrl) frame and/or a management (Mgt) frame aggregated within the PPDU containing the QoS data frames.

In some demonstrative aspects, multiple QoS flows may be differentiated by respective TIDs of the QoS flows, for example, when the QoS flows are mapped to a same SCSID. For example, instead of including a TID field, an SCS Descriptor may carry a TID bitmap field so that a tuple, e.g., a tuple (SCSID, TID), may be used as the flow identifier.

In some demonstrative aspects, in case an A-MSDU mechanism is enabled, multiple MSDUs belonging to a QoS flow may be allowed to be aggregated in a same A-MSDU, for example, only if they have similar importance, e.g., similar priority.

In some demonstrative aspects, a STA, for example, an intermediate node, e.g., an AP implemented by device 102, may be configured to use the QoS information in one or more received QoS data frames, for example, to schedule forwarding of the QoS data frames, e.g., as described below.

For example, the AP implemented by device 102 may utilize the QoS information in the QoS data frames received from the STA implemented by device 140, for example, to forward the QoS data frames to a STA implemented by device 150.

In some demonstrative aspects, the STA receiving the QoS data frames, e.g., device 102, may be configured to group MSDUs belonging to flows with a same XR multi-modal flow ID and/or a same XR frame set ID together.

In some demonstrative aspects, the STA receiving the QoS data frames, e.g., device 102, may be configured to drop one or more QoS data frames with lower priority, for example, if the STA is constrained for resources.

In some demonstrative aspects, the STA receiving the QoS data frames, e.g., device 102, may be configured to wait until reception of QoS data frames within a frame set of the received QoS data frames, e.g., for all the QoS data frames within the frame set, for example, before transmitting the QoS data frames the STA has already received.

Figure 4:
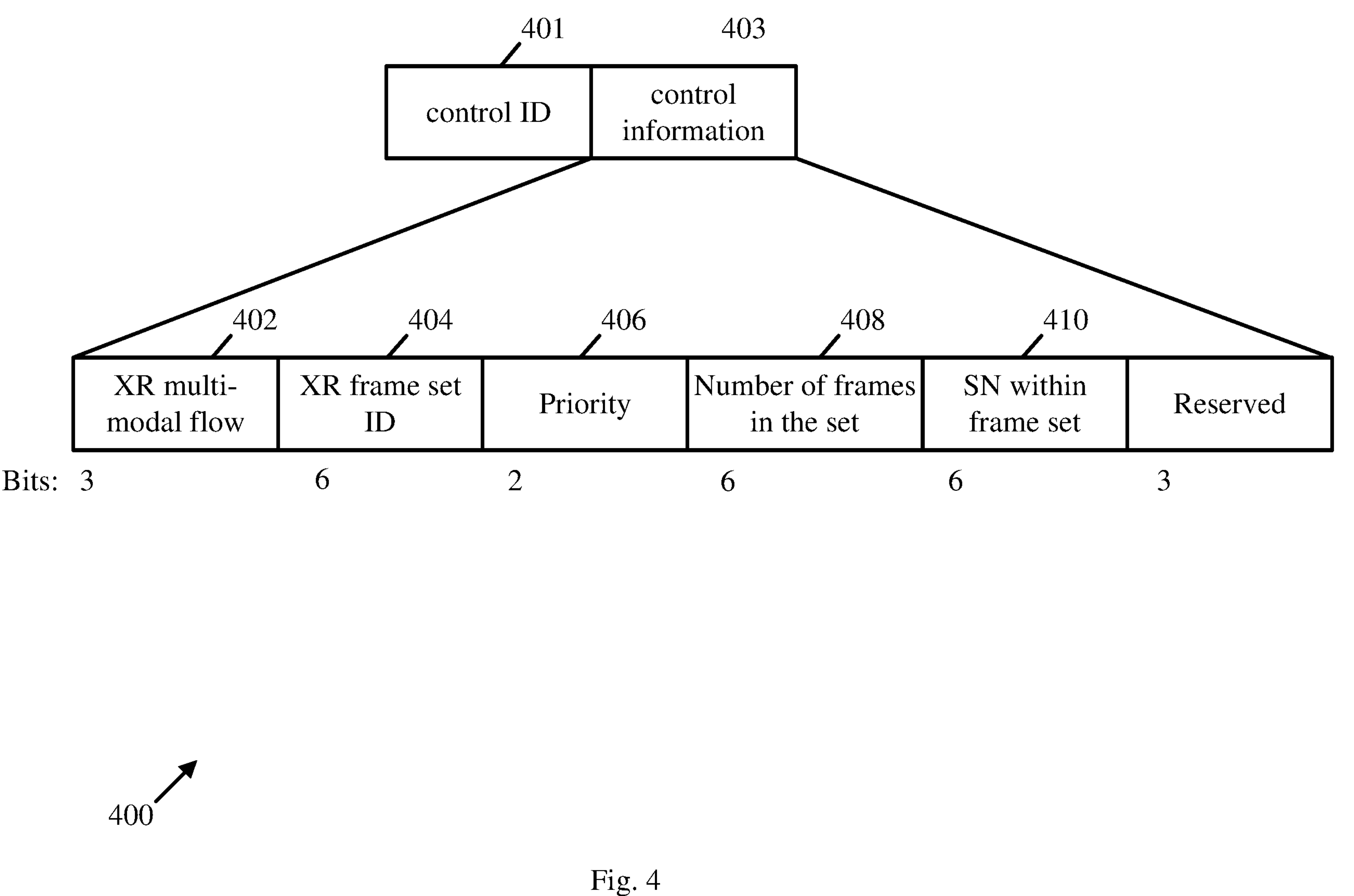
FIG. 4 is a schematic illustration of a control information subfield format of an Aggregated Control (A-Ctrl) field, in accordance with some demonstrative aspects.

Reference is made to FIG. 4, which schematically illustrates a control information subfield format of an A-Ctrl field 400, in accordance with some demonstrative aspects.

In some demonstrative aspects, device 140 (FIG. 1) and/or device 102 may be configured to communicate a frame including A-Ctrl field 400. For example, device 140 (FIG. 1) may be configured to transmit to device 102 (FIG. 1) the frame including A-Ctrl field 400; and/or device 102 (FIG. 1) may be configured to receive from device 140 (FIG. 1) the frame including A-Ctrl field 400.

In some demonstrative aspects, device 140 (FIG. 1) and/or device 102 (FIG. 1) may communicate a QoS data frame including A-Ctrl field 400 to signal QoS information corresponding to the QoS data frame in a traffic flow, for example, in case the traffic flow, e.g., a QoS flow, is identified uniquely from an SCSID.

In some demonstrative aspects, as shown in FIG. 4, A-Ctrl field 400 may include a control ID subfield 401, and a control information subfield 403.

In some demonstrative aspects, the control ID field 401 may be configured to indicate an A-control field type for flow group QoS. For example, the control ID field 401 may be set to a predefined value, which may be configured to indicate the A-control field type for flow group QoS.

In some demonstrative aspects, the control information subfield 403 may include flow-group QoS information corresponding to the QoS data frame, e.g., as described below.

In some demonstrative aspects, as shown in FIG. 4, the control ID subfield 401 may include 4 bits, and the control information subfield 403 may include up to 26 bits. In other aspects, the control ID subfield 401 and/or the control information subfield 403 may be configured with any other size.

In some demonstrative aspects, as shown in FIG. 4, the control information subfield 403 of A-Ctrl field 400 may include an XR multi-modal flow ID subfield 402, for example, to identify an XR multi-modality traffic flow, e.g., as described above.

In some demonstrative aspects, as shown in FIG. 4, the control information subfield 403 of A-Ctrl field 400 may include an XR frame set ID subfield 404, for example, to identify a QoS frame set to which the QoS data frame belongs, e.g., as described above.

In some demonstrative aspects, as shown in FIG. 4, the control information subfield 403 of A-Ctrl field 400 may include a priority subfield 406, for example, to indicate a priority of the QoS data frame within the QoS frame set, e.g., as described above.

In other aspects, priority subfield 406 may be configured to indicate a priority of the QoS frame set.

In some demonstrative aspects, as shown in FIG. 4, the control information subfield 403 of A-Ctrl field 400 may include a number of frames in the set subfield 408, for example, to indicate a number of frames within the QoS frame set, e.g., as described above.

In some demonstrative aspects, as shown in FIG. 4, the control information subfield 403 of A-Ctrl field 400 may include an SN within frame set subfield 410, for example, to indicate a SN of the QoS data frame within the QoS frame set, e.g., as described above.

Figure 5:
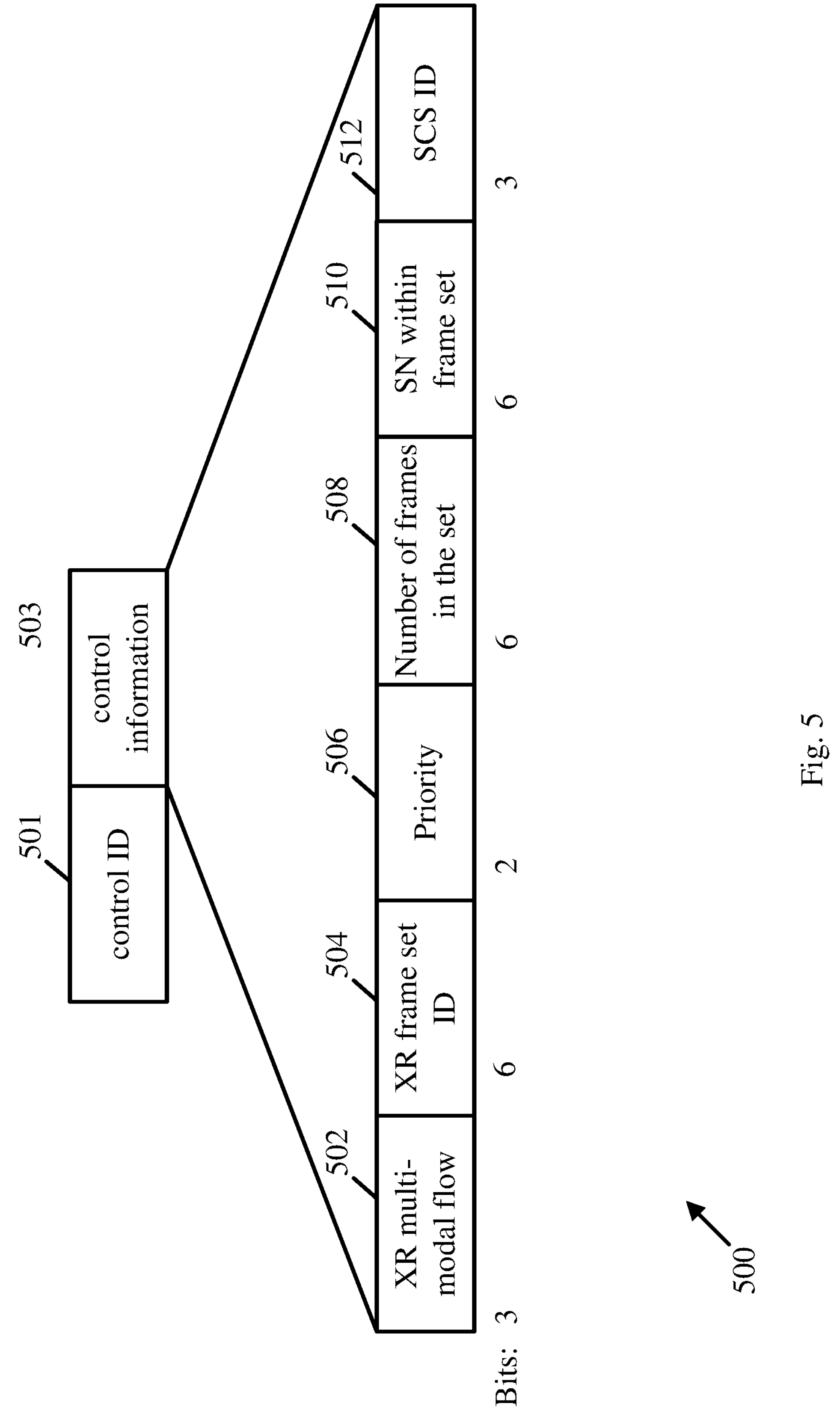
FIG. 5 is a schematic illustration of a control information subfield format of an A-Ctrl field, in accordance with some demonstrative aspects.

Reference is made to FIG. 5, which schematically illustrates a control information subfield format of an A-Ctrl field 500, in accordance with some demonstrative aspects.

In some demonstrative aspects, device 140 (FIG. 1) and/or device 102 may be configured to communicate a frame including A-Ctrl field 500. For example, device 140 (FIG. 1) may be configured to transmit to device 102 (FIG. 1) the frame including A-Ctrl field 500; and/or device 102 (FIG. 1) may be configured to receive from device 140 (FIG. 1) the frame including A-Ctrl field 500.

In some demonstrative aspects, device 140 (FIG. 1) and/or device 102 (FIG. 1) may communicate a QoS data frame including A-Ctrl field 500 to signal QoS information corresponding to the QoS frame in a traffic flow, for example, in case the traffic flow, e.g., a QoS flow, is identified explicitly through an included SCSID, which may be shortened to 3 bits, or may have any other length.

In some demonstrative aspects, A-Ctrl field 500 may carry the QoS information, e.g., detailed QoS flow information, with an explicit SCSID and/or an XR multi-modal flow ID, e.g., as described below.

In some demonstrative aspects, as shown in FIG. 5, A-Ctrl field 500 may a control ID subfield 501, and a control information subfield 503.

In some demonstrative aspects, the control ID field 501 may be configured to indicate an A-control field type for flow group QoS. For example, the control ID field 501 may be set to a predefined value, which may be configured to indicate the A-control field type for flow group QoS.

In some demonstrative aspects, the control information subfield 503 may include flow-group QoS information corresponding to the QoS data frame, e.g., as described below.

In some demonstrative aspects, as shown in FIG. 5, the control ID subfield 501 may include 4 bits, and the control information subfield 503 may include up to 26 bits. In other aspects, the control ID subfield 501 and/or the control information subfield 503 may be configured with any other size.

In some demonstrative aspects, as shown in FIG. 5, the control information subfield 503 of A-Ctrl field 500 may include an XR multi-modal flow ID subfield 502, for example, to identify an XR multi-modality traffic flow, e.g., as described above.

In some demonstrative aspects, as shown in FIG. 5, the control information subfield 503 of A-Ctrl field 500 may include an XR frame set ID subfield 504, for example, to identify a QoS frame set to which the QoS data frame belongs, e.g., as described above.

In some demonstrative aspects, as shown in FIG. 5, the control information subfield 503 of A-Ctrl field 500 may include a priority subfield 506, for example, to indicate a priority of the QoS data frame within the QoS frame set, e.g., as described above.

In other aspects, priority subfield 506 may be configured to indicate a priority of the QoS frame set.

In some demonstrative aspects, as shown in FIG. 5, the control information subfield 503 of A-Ctrl field 500 may include a number of frames in the set subfield 508, for example, to indicate a number of frames within the QoS frame set, e.g., as described above.

In some demonstrative aspects, as shown in FIG. 5, the control information subfield 503 of A-Ctrl field 500 may include an SN within frame set subfield 510, for example, to indicate a SN of the QoS data frame within the QoS frame set, e.g., as described above.

In some demonstrative aspects, as shown in FIG. 5, the control information subfield 503 of A-Ctrl field 500 may include an SCSID subfield 512, for example, to identify an SCSID allocated to a plurality of QoS flows, e.g., including the QoS flow, which includes the QoS data frame.

In some demonstrative aspects, as shown in FIG. 5, the SCSID subfield 512 may be configured to include a shortened version of the SCSID, e.g., a 3-bit SCSID.

Figure 6:
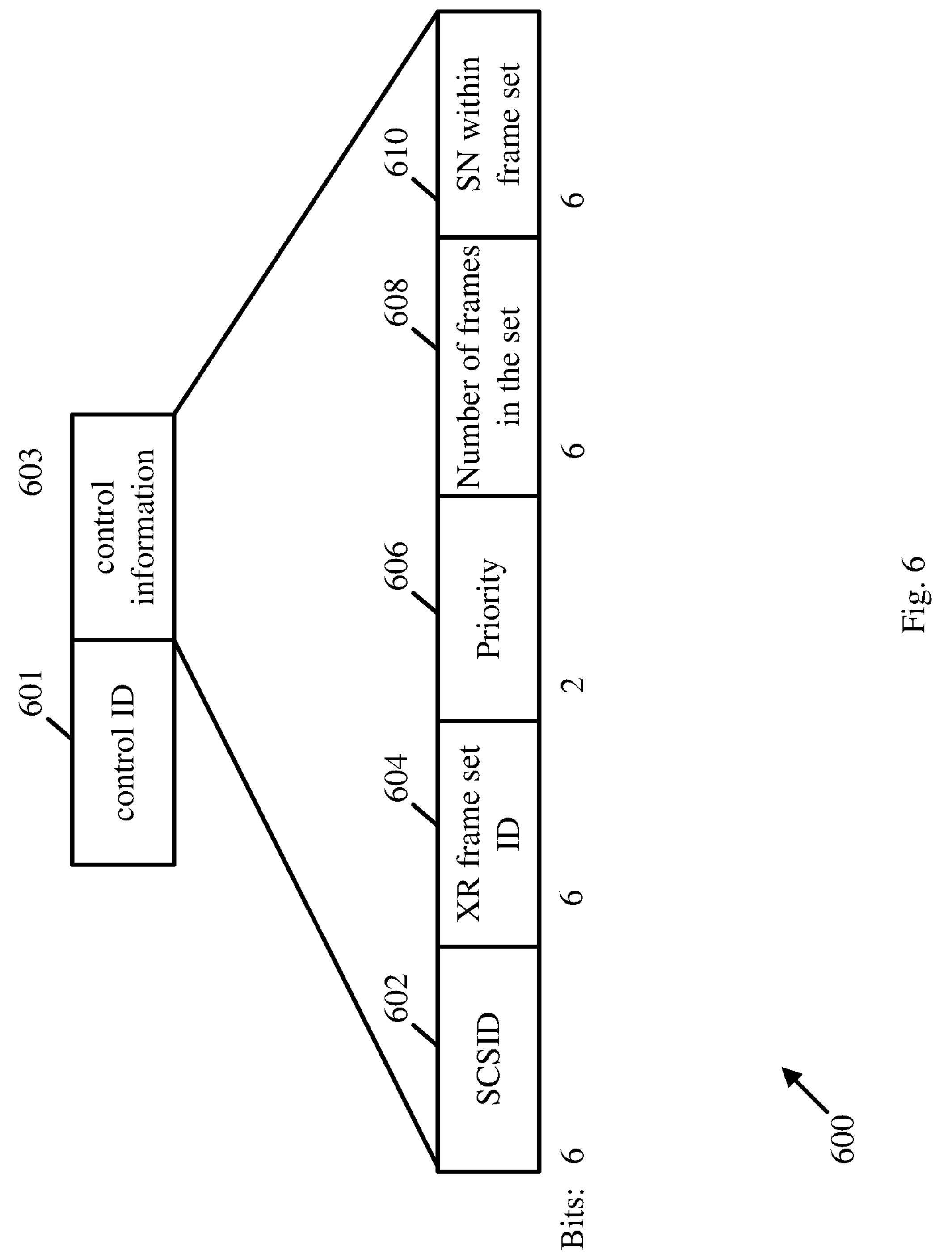
FIG. 6 is a schematic illustration of a control information subfield format of an A-Ctrl field, in accordance with some demonstrative aspects.

Reference is made to FIG. 6, which schematically illustrates a control information subfield format of an A-Ctrl field 600, in accordance with some demonstrative aspects.

In some demonstrative aspects, device 140 (FIG. 1) and/or device 102 may be configured to communicate a frame including A-Ctrl field 600. For example, device 140 (FIG. 1) may be configured to transmit to device 102 (FIG. 1) the frame including A-Ctrl field 600; and/or device 102 (FIG. 1) may be configured to receive from device 140 (FIG. 1) the frame including A-Ctrl field 600.

In some demonstrative aspects, device 140 (FIG. 1) and/or device 102 (FIG. 1) may communicate a QoS data frame including A-Ctrl field 600 to signal QoS information corresponding to the QoS frame in a traffic flow, for example, in case the traffic flow, e.g., a QoS flow, is identified explicitly through an included SCSID.

In some demonstrative aspects, device 140 (FIG. 1) and/or device 102 (FIG. 1) may communicate the QoS data frame including A-Ctrl field 600 to signal QoS information, e.g., without including an XR multi-modal flow ID. For example, A-Ctrl field 600 may include the SCSID, which may be configured to provide complete information about which traffic flow, e.g., a multi-modal flow, the QoS information belongs to, e.g., from negotiation.

In some demonstrative aspects, as shown in FIG. 6, A-Ctrl field 600 may a control ID subfield 601, and a control information subfield 603.

In some demonstrative aspects, the control ID field 601 may be configured to indicate an A-control field type for flow group QoS. For example, the control ID field 601 may be set to a predefined value, which may be configured to indicate the A-control field type for flow group QoS.

In some demonstrative aspects, the control information subfield 603 may include flow-group QoS information corresponding to the QoS data frame, e.g., as described below.

In some demonstrative aspects, as shown in FIG. 6, the control ID subfield 601 may include 4 bits, and the control information subfield 603 may include up to 26 bits. In other aspects, the control ID subfield 601 and/or the control information subfield 603 may be configured with any other size.

In some demonstrative aspects, as shown in FIG. 6, the control information subfield 603 of A-Ctrl field 600 may include an SCSID subfield 602, e.g., a 6-bit SCSID subfield 602, for example, to identify an SCSID allocated to a plurality of QoS flows, e.g., including the QoS flow, which includes the QoS data frame.

In some demonstrative aspects, as shown in FIG. 6, the control information subfield 603 of A-Ctrl field 600 may include an XR frame set ID subfield 604, for example, to identify a QoS frame set to which the QoS data frame belong, e.g., as described above.

In some demonstrative aspects, as shown in FIG. 6, the control information subfield 603 of A-Ctrl field 600 may include a priority subfield 606, for example, to indicate a priority of the QoS data frame within the QoS frame set, e.g., as described above.

In other aspects, priority subfield 606 may be configured to indicate a priority of the QoS frame set.

In some demonstrative aspects, as shown in FIG. 6, the control information subfield 603 of A-Ctrl field 600 may include a number of frames in the set subfield 608, for example, to indicate a number of frames within the QoS frame set, e.g., as described above.

In some demonstrative aspects, as shown in FIG. 6, the control information subfield 603 of A-Ctrl field 600 may include an SN within frame set subfield 610, for example, to indicate a SN of the QoS data frame within the QoS frame set, e.g., as described above.

Figure 7:
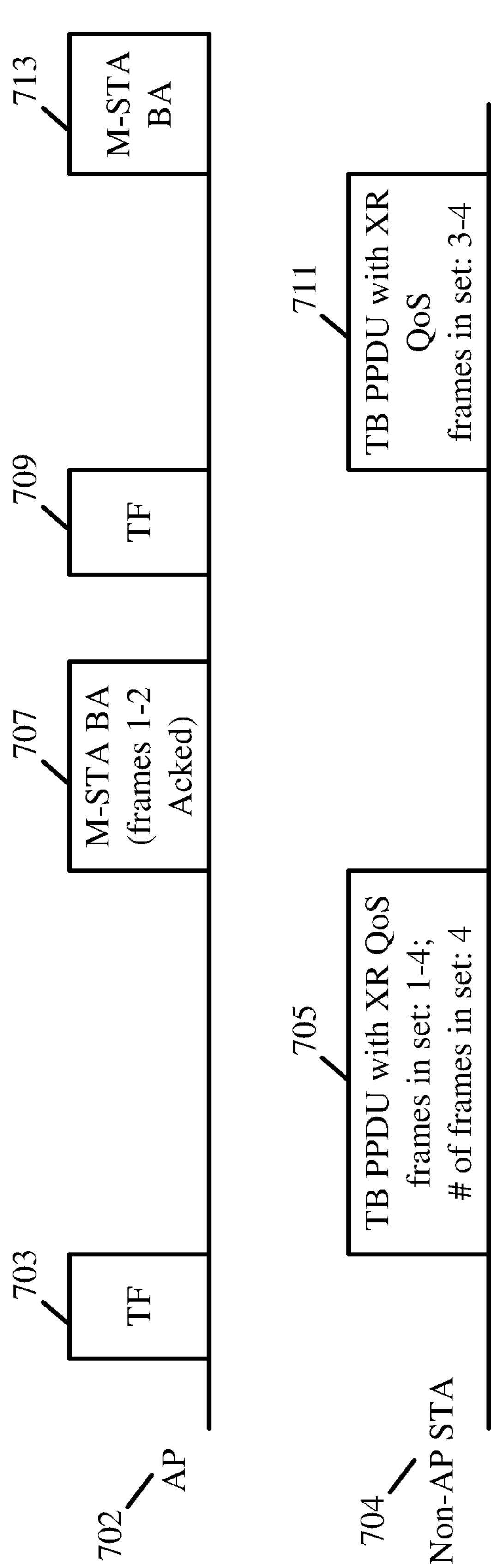
FIG. 7 is a schematic illustration of communications by a first wireless communication device and a second wireless communication device according to a communication scheme utilizing flow-group Quality of Service (QoS) information, in accordance with some demonstrative aspects.

Reference is made to FIG. 7, which schematically illustrates communications by a first wireless communication device and a second wireless communication device according to a communication scheme utilizing flow-group QoS information, in accordance with some demonstrative aspects.

For example, a STA implemented by device 102 (FIG. 1) may include, operate as, perform the role of, and/or perform one or more functionalities of, an AP 702. For example, a STA implemented by device 140 (FIG. 1) may include, operate as, perform the role of, and/or perform one or more functionalities of, a non-AP STA 704.

In some demonstrative aspects, AP 702 and non-AP STA 704 may communicate one or more frames, e.g., QoS data frames, for example, according to a flow-group scheduling mechanism.

In some demonstrative aspects, one or more frames sent from non-AP STA 704 may not be received successfully by AP 702, for example, due to a channel error.

In some demonstrative aspects, AP 702 may use explicit knowledge of missing frames derived from a QoS frame set to schedule the missing frames, for example, with reduced, e.g., minimal, latency, e.g., as described below.

In some demonstrative aspects, AP 702 may utilize QoS information received from non-AP STA 704 in one or more QoS data frames, e.g., XR frames, for example, to derive a number of the QoS data frames that were not successfully delivered to AP 702. For example, AP 702 may send a trigger frame (TF), e.g., right away after deriving the number of missing QoS data frames, for example, to solicit the QoS data frames that were not successfully delivered.

In some demonstrative aspects, as shown in FIG. 7, AP 702 may be configured to generate and transmit a TF 703 to non-AP STA 704, for example, to trigger transmission of a PPDU 705.

In some demonstrative aspects, as shown in FIG. 7, non-AP STA 704 may transmit PPDU 705 including a plurality of QoS data frames.

In one example, the QoS data frames of PPDU 705 may include XR frames. In another example, the QoS data frames may include any other type of data frames.

In some demonstrative aspects, as shown in FIG. 7, PPDU 705 may include four QoS data frames, e.g., frames assigned with SN 1-4, which may need to be successfully delivered within a latency bound.

In some demonstrative aspects, as shown in FIG. 7, the frames 3-4, which were sent within PPDU 705 as response to TF 703, were not successfully delivered to AP 702, for example, due to channel error. For example, AP 702 may transmit a Block Acknowledgement (BA) frame 707, for example, to acknowledge successful reception of only two QoS data frames out of the four transmitted frames, e.g., frames with the SN 1-2.

In some demonstrative aspects, AP 702 may be configured to implement a scheduler algorithm, which may calculate frames 3-4 are missing from PPDU 705 received at AP 702, and to schedule frames 3-4 in another TF.

In some demonstrative aspects, as shown in FIG. 7, AP 702 may transmit a TF 709, for example, to trigger transmission of the missing frames 3-4.

In some demonstrative aspects, as shown in FIG. 7, non-AP STA 704 may transmit a PPDU 711 including the missing QoS data frames, e.g., frames 3-4.

In some demonstrative aspects, as shown in FIG. 7, AP 702 may transmit a BA 713, for example, to acknowledge reception of PPDU 711 including the frames 3-4.

Figure 8:
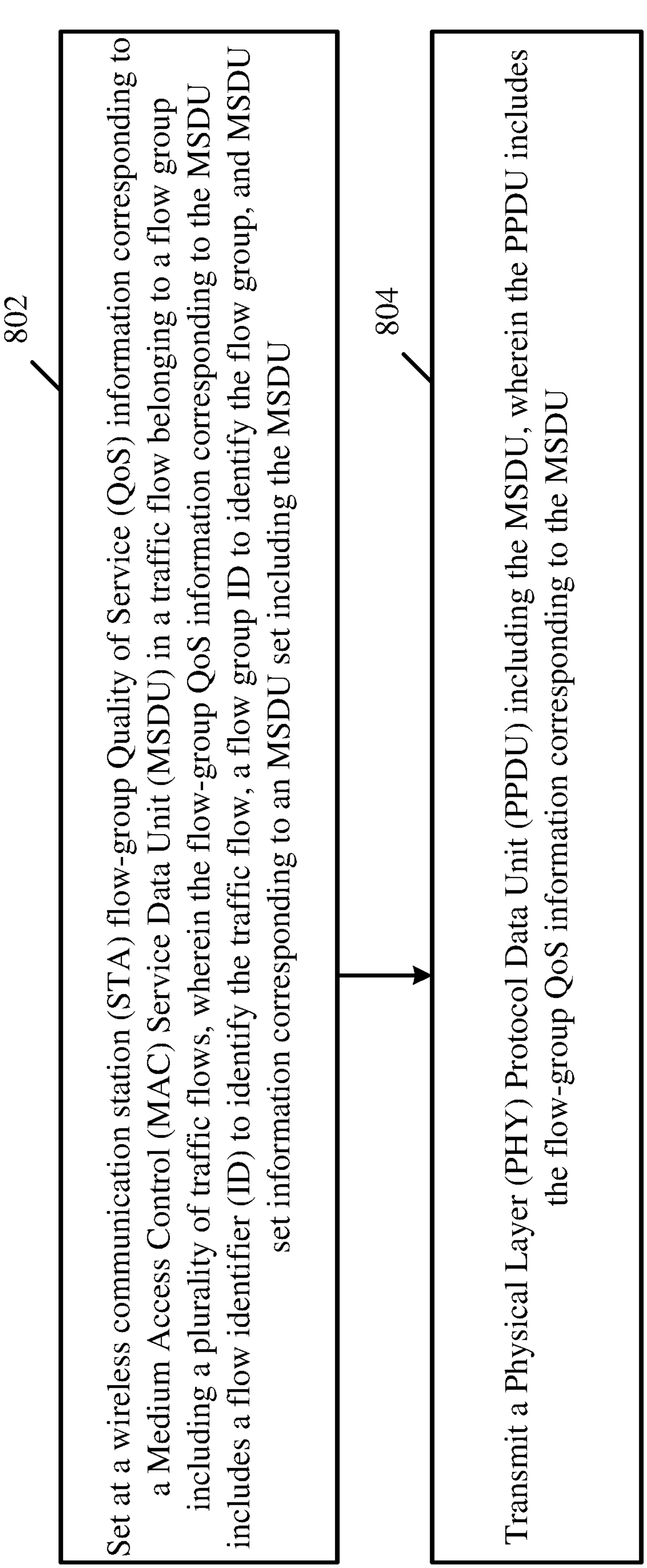
FIG. 8 is a schematic flow-chart illustration of a method of communicating flow-group QoS information, in accordance with some demonstrative aspects.

Reference is made to FIG. 8, which schematically illustrates a method of communicating flow-group QoS information, in accordance with some demonstrative aspects. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include setting at a STA flow-group QoS information corresponding to an MSDU in a traffic flow belonging to a flow group including a plurality of traffic flows. For example, the flow-group QoS information corresponding to the MSDU may include a flow ID to identify the traffic flow, a flow group ID to identify the flow group, and/or MSDU set information corresponding to an MSDU set including the MSDU. For example, controller 154 (FIG. 1) may be configured to cause, trigger, and/or control device 140 (FIG. 1) to set flow-group QoS information corresponding to an MSDU in a traffic flow belonging to a flow group including a plurality of traffic flows, e.g., as described above.

As indicated at block 804, the method may include transmitting a PPDU including the MSDU. For example, the PPDU may include the flow-group QoS information corresponding to the MSDU. For example, controller 154 (FIG. 1) may be configured to cause, trigger, and/or control device 140 (FIG. 1) to transmit a PPDU including the flow-group QoS information corresponding to the MSDU, e.g., as described above.

Figure 9:
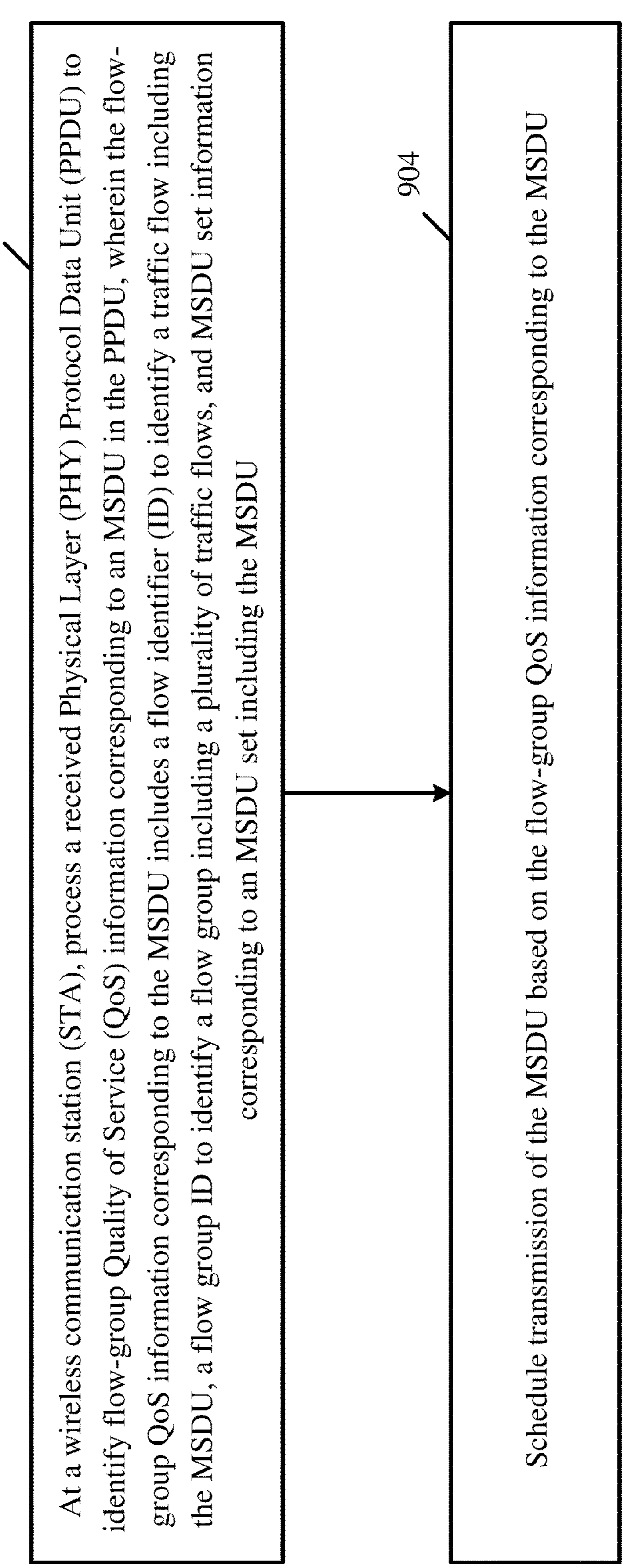
FIG. 9 is a schematic flow-chart illustration of a method of communicating flow-group QoS information, in accordance with some demonstrative aspects.

Reference is made to FIG. 9, which schematically illustrates a method of communicating flow-group QoS information, in accordance with some demonstrative aspects. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include processing at a STA a received PPDU to identify flow-group QoS information corresponding to an MSDU in the PPDU. For example, the flow-group QoS information corresponding to the MSDU may include a flow ID to identify a traffic flow including the MSDU, a flow group ID to identify a flow group including a plurality of traffic flows, and/or MSDU set information corresponding to an MSDU set including the MSDU. For example, controller 124 (FIG. 1) may be configured to cause, trigger, and/or control device 102 (FIG. 1) to process a received PPDU to identify flow-group QoS information corresponding to an MSDU in the PPDU, e.g., as described above.

As indicated at block 904, the method may include scheduling transmission of the MSDU based on the flow-group QoS information corresponding to the MSDU. For example, controller 124 (FIG. 1) may be configured to cause, trigger, and/or control device 102 (FIG. 1) to schedule transmission of the MSDU based on the flow-group QoS information corresponding to the MSDU, e.g., as described above.

Figure 10:
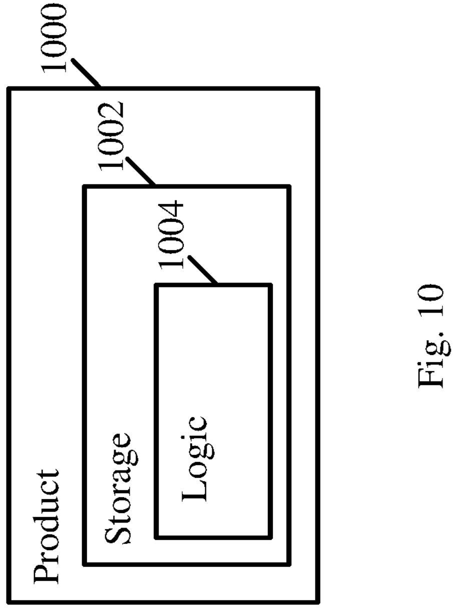
FIG. 10 is a schematic illustration of a product of manufacture, in accordance with some demonstrative aspects.

Reference is made to FIG. 10, which schematically illustrates a product of manufacture 1000, in accordance with some demonstrative aspects. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, 7, 8, and/or 9, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1000 and/or machine-readable storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication station (STA) to set flow-group Quality of Service (QoS) information corresponding to a Medium Access Control (MAC) Service Data Unit (MSDU) in a traffic flow belonging to a flow group comprising a plurality of traffic flows, wherein the flow-group QoS information corresponding to the MSDU comprises a flow identifier (ID) to identify the traffic flow, a flow group ID to identify the flow group, and MSDU set information corresponding to an MSDU set comprising the MSDU; and transmit a Physical Layer (PHY) Protocol Data Unit (PPDU) comprising the MSDU, wherein the PPDU comprises the flow-group QoS information corresponding to the MSDU.

Example 2 includes the subject matter of Example 1, and optionally, wherein the apparatus is configured to cause the STA to set the flow-group QoS information in a MAC header of the PPDU.

Example 3 includes the subject matter of Example 2, and optionally, wherein the apparatus is configured to cause the STA to set the flow-group QoS information in an Aggregated Control (A-control) field in the MAC header of the PPDU.

Example 4 includes the subject matter of Example 3, and optionally, wherein the A-control field comprises a control ID subfield, and a control information subfield, wherein the control ID field is configured to indicate an A-control field type for flow group QoS, wherein the control information subfield comprises the flow-group QoS information.

Example 5 includes the subject matter of Example 4, and optionally, wherein the control ID subfield comprises 4 bits, and the control information subfield comprises up to 26 bits.

Example 6 includes the subject matter of Example 1, and optionally, wherein the apparatus is configured to cause the STA to set the flow-group QoS information as metadata in a payload of the MSDU.

Example 7 includes the subject matter of Example 1, and optionally, wherein the apparatus is configured to cause the STA to set the flow-group QoS information in a control or management frame aggregated with the MSDU in the PPDU.

Example 8 includes the subject matter of any one of Examples 1-7, and optionally, wherein the MSDU set information comprises an MSDU set ID to identify the MSDU set.

Example 9 includes the subject matter of any one of Examples 1-8, and optionally, wherein the MSDU set information comprises a Serial Number (SN) to indicate a SN of the MSDU within the MSDU set.

Example 10 includes the subject matter of Example 9, and optionally, wherein the SN of the MSDU within the MSDU set is based on a MAC Protocol Data Unit (MPDU) SN of an MPDU comprising the MSDU.

Example 11 includes the subject matter of any one of Examples 1-10, and optionally, wherein the MSDU set information comprises MSDU priority information to indicate a priority of the MSDU within the MSDU set.

Example 12 includes the subject matter of any one of Examples 1-11, and optionally, wherein the MSDU set information comprises MSDU set priority information to indicate a priority of the MSDU set.

Example 13 includes the subject matter of any one of Examples 1-12, and optionally, wherein the MSDU set information comprises MSDU count information to indicate a number of MSDUs within the MSDU set.

Example 14 includes the subject matter of any one of Examples 1-13, and optionally, wherein the traffic flow comprises an Extended Reality (XR) traffic flow, wherein the flow group ID comprises an Extended Reality (XR) multi-modal flow ID to identify an XR multi-modality traffic flow.

Example 15 includes the subject matter of any one of Examples 1-14, and optionally, wherein the flow ID comprises a Stream Classification Service (SCS) ID (SCSID) to identify the traffic flow.

Example 16 includes the subject matter of any one of Examples 1-15, and optionally, wherein the flow ID comprises a tuple configured to identify the traffic flow, wherein the tuple comprises a Stream Classification Service (SCS) ID (SCSID) to identify a plurality of QoS flows, and a Traffic Identifier (TID) to identify the traffic flow within the plurality of QoS flows.

Example 17 includes the subject matter of any one of Examples 1-16, and optionally, wherein the apparatus is configured to allow the STA to generate the PPDU comprising an Aggregate MSDU (A-MSDU) comprising an aggregation of a plurality of MSDUs having a same QoS importance.

Example 18 includes the subject matter of any one of Examples 1-17, and optionally, wherein the flow group comprises a plurality of QoS-correlated traffic flows according to a QoS correlation requirement.

Example 19 includes the subject matter of any one of Examples 1-18, and optionally, wherein the flow group comprises a plurality of traffic flows to be synchronized according to a QoS synchronization requirement.

Example 20 includes the subject matter of any one of Examples 1-19, and optionally, wherein the flow group comprises a multi-modality traffic flow comprising a plurality of dependent data streams.

Example 21 includes the subject matter of any one of Examples 1-20, and optionally, wherein the traffic flow comprises an Extended Reality (XR) traffic flow.

Example 22 includes the subject matter of any one of Examples 1-21, and optionally, wherein the STA comprises a non Access Point (AP) (non-AP) STA to transmit the PPDU to an AP.

Example 23 includes the subject matter of any one of Examples 1-22, and optionally, comprising at least one radio to transmit the PPDU.

Example 24 includes the subject matter of Example 23, and optionally, comprising one or more antennas connected to the radio, and a processor to execute instructions of an operating system of the STA.

Example 25 includes an apparatus comprising logic and circuitry configured to cause a wireless communication station (STA) to process a received Physical Layer (PHY) Protocol Data Unit (PPDU) to identify flow-group Quality of Service (QoS) information corresponding to an MSDU in the PPDU, wherein the flow-group QoS information corresponding to the MSDU comprises a flow identifier (ID) to identify a traffic flow comprising the MSDU, a flow group ID to identify a flow group comprising a plurality of traffic flows, and MSDU set information corresponding to an MSDU set comprising the MSDU; and schedule transmission of the MSDU based on the flow-group QoS information corresponding to the MSDU.

Example 26 includes the subject matter of Example 25, and optionally, wherein the apparatus is configured to cause the STA to select whether to schedule the MSDU in a group transmission together with one or more other MSDUs based on the flow-group QoS information corresponding to the MSDU.

Example 27 includes the subject matter of Example 25 or 26, and optionally, wherein the apparatus is configured to cause the STA to select whether to schedule the MSDU in a group transmission together with one or more other MSDUs based on at least one of the flow group ID corresponding to the MSDU, or the MSDU set ID corresponding to the MSDU.

Example 28 includes the subject matter of any one of Examples 25-27, and optionally, wherein the apparatus is configured to cause the STA to select to schedule the MSDU in a group transmission together with one or more other MSDUs having a same flow group ID as the MSDU, and a same MSDU set ID as the MSDU.

Example 29 includes the subject matter of any one of Examples 25-28, and optionally, wherein the apparatus is configured to cause the STA to select to drop one or more other MSDUs having a lower priority than a priority of the MSDU indicated by the flow-group QoS information corresponding to the MSDU.

Example 30 includes the subject matter of any one of Examples 25-29, and optionally, wherein the apparatus is configured to cause the STA to schedule transmission of the MSDU to be transmitted only after one or more other MSDUs of the MSDU set have been received by the STA.

Example 31 includes the subject matter of any one of Examples 25-30, and optionally, wherein the apparatus is configured to cause the STA to schedule transmission of the MSDU to be transmitted only after all other MSDUs of the MSDU set have been received by the STA.

Example 32 includes the subject matter of any one of Examples 25-31, configured to cause the STA to identify the flow-group QoS information in a MAC header of the PPDU.

Example 33 includes the subject matter of Example 32, and optionally, wherein the apparatus is configured to cause the STA to identify the flow-group QoS information in an Aggregated Control (A-control) field in the MAC header of the PPDU.

Example 34 includes the subject matter of Example 33, and optionally, wherein the A-control field comprises a control ID subfield, and a control information subfield, wherein the control ID field is configured to indicate an A-control field type for flow group QoS, wherein the control information subfield comprises the flow-group QoS information.

Example 35 includes the subject matter of Example 34, and optionally, wherein the control ID subfield comprises 4 bits, and the control information subfield comprises up to 26 bits.

Example 36 includes the subject matter of any one of Examples 25-31, and optionally, wherein the apparatus is configured to cause the STA to identify the flow-group QoS information as metadata in a payload of the MSDU.

Example 37 includes the subject matter of any one of Examples 25-31, and optionally, wherein the apparatus is configured to cause the STA to identify the flow-group QoS information in a control or management frame aggregated with the MSDU in the PPDU.

Example 38 includes the subject matter of any one of Examples 25-37, and optionally, wherein the MSDU set information comprises an MSDU set ID to identify the MSDU set.

Example 39 includes the subject matter of any one of Examples 25-38, and optionally, wherein the MSDU set information comprises a Serial Number (SN) to indicate a SN of the MSDU within the MSDU set.

Example 40 includes the subject matter of Example 39, and optionally, wherein the SN of the MSDU within the MSDU set is based on a MAC Protocol Data Unit (MPDU) SN of an MPDU comprising the MSDU.

Example 41 includes the subject matter of any one of Examples 25-40, and optionally, wherein the MSDU set information comprises MSDU priority information to indicate a priority of the MSDU within the MSDU set.

Example 42 includes the subject matter of any one of Examples 25-41, and optionally, wherein the MSDU set information comprises MSDU set priority information to indicate a priority of the MSDU set.

Example 43 includes the subject matter of any one of Examples 25-42, and optionally, wherein the MSDU set information comprises MSDU count information to indicate a number of MSDUs within the MSDU set.

Example 44 includes the subject matter of any one of Examples 25-43, and optionally, wherein the traffic flow comprises an Extended Reality (XR) traffic flow, wherein the flow group ID comprises an Extended Reality (XR) multi-modal flow ID to identify an XR multi-modality traffic flow.

Example 45 includes the subject matter of any one of Examples 25-44, and optionally, wherein the flow ID comprises a Stream Classification Service (SCS) ID (SCSID) to identify the traffic flow.

Example 46 includes the subject matter of any one of Examples 25-45, and optionally, wherein the flow ID comprises a tuple configured to identify the traffic flow, wherein the tuple comprises a Stream Classification Service (SCS) ID (SCSID) to identify a plurality of QoS flows, and a Traffic Identifier (TID) to identify the traffic flow within the plurality of QoS flows.

Example 47 includes the subject matter of any one of Examples 25-46, and optionally, wherein the PPDU comprises an Aggregate MSDU (A-MSDU) comprising an aggregation of a plurality of MSDUs having a same QoS importance.

Example 48 includes the subject matter of any one of Examples 25-47, and optionally, wherein the flow group comprises a plurality of QoS-correlated traffic flows according to a QoS correlation requirement.

Example 49 includes the subject matter of any one of Examples 25-48, and optionally, wherein the flow group comprises a plurality of traffic flows to be synchronized according to a QoS synchronization requirement.

Example 50 includes the subject matter of any one of Examples 25-49, and optionally, wherein the flow group comprises a multi-modality traffic flow comprising a plurality of dependent data streams.

Example 51 includes the subject matter of any one of Examples 25-50, and optionally, wherein the traffic flow comprises an Extended Reality (XR) traffic flow.

Example 52 includes the subject matter of any one of Examples 25-51, and optionally, wherein the STA comprises an Access Point (AP), and wherein the PPDU is from a non-AP STA.

Example 53 includes the subject matter of any one of Examples 25-52, and optionally, comprising at least one radio to transmit the PPDU.

Example 54 includes the subject matter of Example 53, and optionally, comprising one or more antennas connected to the radio, and a processor to execute instructions of an operating system of the STA.

Example 55 comprises a wireless communication device comprising the apparatus of any of Examples 1-54.

Example 56 comprises an apparatus comprising means for executing any of the described operations of any of Examples 1-54.

Example 57 comprises a product comprising one or more tangible computer-readable non-transitory storage media comprising instructions operable to, when executed by at least one processor, enable the at least one processor to cause a wireless communication device to perform any of the described operations of any of Examples 1-54.

Example 58 comprises an apparatus comprising: a memory interface; and processing circuitry configured to: perform any of the described operations of any of Examples 1-54.

Example 59 comprises a method comprising any of the described operations of any of Examples 1-54.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station (STA) to:

set flow-group Quality of Service (QoS) information corresponding to a Medium Access Control (MAC) Service Data Unit (MSDU) in a traffic flow belonging to a flow group comprising a plurality of traffic flows, wherein the flow-group QoS information corresponding to the MSDU comprises a flow identifier (ID) to identify the traffic flow, a flow group ID to identify the flow group, and MSDU set information corresponding to an MSDU set comprising the MSDU; and transmit a Physical Layer (PHY) Protocol Data Unit (PPDU) comprising the MSDU, wherein the PPDU comprises the flow-group QoS information corresponding to the MSDU.

2. The apparatus of claim 1 configured to cause the STA to set the flow-group QoS information in a MAC header of the PPDU.

3. The apparatus of claim 2 configured to cause the STA to set the flow-group QoS information in an Aggregated Control (A-control) field in the MAC header of the PPDU.

4. The apparatus of claim 3, wherein the A-control field comprises a control ID subfield, and a control information subfield, wherein the control ID subfield is configured to indicate an A-control field type for flow group QoS, wherein the control information subfield comprises the flow-group QoS information.

5. The apparatus of claim 4, wherein the control ID subfield comprises 4 bits, and the control information subfield comprises up to 26 bits.

6. The apparatus of claim 1 configured to cause the STA to set the flow-group QoS information as metadata in a payload of the MSDU.

7. The apparatus of claim 1 configured to cause the STA to set the flow-group QoS information in a control or management frame aggregated with the MSDU in the PPDU.

8. The apparatus of claim 1, wherein the MSDU set information comprises an MSDU set ID to identify the MSDU set.

9. The apparatus of claim 1, wherein the MSDU set information comprises a Serial Number (SN) to indicate a SN of the MSDU within the MSDU set.

10. The apparatus of claim 1, wherein the MSDU set information comprises MSDU priority information to indicate a priority of the MSDU within the MSDU set.

11. The apparatus of claim 1, wherein the MSDU set information comprises MSDU set priority information to indicate a priority of the MSDU set.

12. The apparatus of claim 1, wherein the traffic flow comprises an Extended Reality (XR) traffic flow, wherein the flow group ID comprises an Extended Reality (XR) multi-modal flow ID to identify an XR multi-modality traffic flow.

13. The apparatus of claim 1, wherein the flow ID comprises a Stream Classification Service (SCS) ID (SCSID) to identify the traffic flow.

14. The apparatus of claim 1, wherein the flow ID comprises a tuple configured to identify the traffic flow, wherein the tuple comprises a Stream Classification Service (SCS) ID (SCSID) to identify a plurality of QoS flows, and a Traffic Identifier (TID) to identify the traffic flow within the plurality of QoS flows.

15. The apparatus of claim 1 configured to allow the STA to generate the PPDU comprising an Aggregate MSDU (A-MSDU) comprising an aggregation of a plurality of MSDUs having a same QoS importance.

16. The apparatus of claim 1, wherein the flow group comprises a plurality of QoS-correlated traffic flows according to a QoS correlation requirement.

17. The apparatus of claim 1, wherein the flow group comprises a multi-modality traffic flow comprising a plurality of dependent data streams.

18. The apparatus of claim 1 comprising at least one radio to transmit the PPDU, one or more antennas connected to the radio, and a processor to execute instructions of an operating system of the STA.

19. A product comprising one or more tangible computer-readable non-transitory storage media comprising instructions operable to, when executed by at least one processor, enable the at least one processor to cause a wireless communication station (STA) to:

set flow-group Quality of Service (QoS) information corresponding to a Medium Access Control (MAC) Service Data Unit (MSDU) in a traffic flow belonging to a flow group comprising a plurality of traffic flows, wherein the flow-group QoS information corresponding to the MSDU comprises a flow identifier (ID) to identify the traffic flow, a flow group ID to identify the flow group, and MSDU set information corresponding to an MSDU set comprising the MSDU; and transmit a Physical Layer (PHY) Protocol Data Unit (PPDU) comprising the MSDU, wherein the PPDU comprises the flow-group QoS information corresponding to the MSDU.

20. The product of claim 19, wherein the instructions, when executed, cause the STA to set the flow-group QoS information in a MAC header of the PPDU.

* * * * *